(12) United States Patent
Florissi et al.

(10) Patent No.: US 9,158,843 B1
(45) Date of Patent: Oct. 13, 2015

(54) ADDRESSING MECHANISM FOR DATA AT WORLD WIDE SCALE

(75) Inventors: Patricia G. S. Florissi, Briarcliff Manor, NY (US); Sudhir Vijendra, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 263 days.

(21) Appl. No.: 13/535,744

(22) Filed: Jun. 28, 2012

Related U.S. Application Data

(63) Continuation-in-part of application No. 13/435,009, filed on Mar. 30, 2012.

(51) Int. Cl.
*G06F 15/16* (2006.01)
*G06F 17/30* (2006.01)
*H04L 29/08* (2006.01)

(52) U.S. Cl.
CPC ...... *G06F 17/30823* (2013.01); *H04L 67/1097* (2013.01)

(58) Field of Classification Search
CPC .... G06F 17/30861–17/3089; H04L 29/12009; H04L 29/12047; H04L 61/00; H04L 61/15; H04L 67/1097
See application file for complete search history.

(56) References Cited

U.S. PATENT DOCUMENTS

| | | | | |
|---|---|---|---|---|
| 5,966,710 | A * | 10/1999 | Burrows | 1/1 |
| 6,341,311 | B1 * | 1/2002 | Smith et al. | 709/226 |
| 6,671,727 | B1 * | 12/2003 | Odenwald | 709/227 |
| 7,293,152 | B1 * | 11/2007 | Srinivasan et al. | 711/202 |
| 7,707,338 | B1 * | 4/2010 | Walch et al. | 710/74 |
| 7,831,681 | B1 * | 11/2010 | Salli | 709/212 |
| 8,015,266 | B1 * | 9/2011 | Lee et al. | 709/220 |
| 2003/0140277 | A1 * | 7/2003 | Beer et al. | 714/25 |
| 2005/0080982 | A1 * | 4/2005 | Vasilevsky et al. | 711/1 |
| 2009/0063495 | A1 * | 3/2009 | Gomez et al. | 707/10 |
| 2011/0202888 | A1 * | 8/2011 | Rusu et al. | 715/855 |
| 2012/0079195 | A1 * | 3/2012 | Bolen et al. | 711/114 |
| 2013/0103787 | A1 * | 4/2013 | Glover et al. | 709/217 |

OTHER PUBLICATIONS

Yuan Luo, Zhenhua Guo, Yiming Sun, Beth Plale, Judy Qiu, Wilfred W. Li; A Hierarchical Framework for Cross-Domain MapReduce Execution; School of Informatics and Computing, Indiana University, Bloomington, IN, 47405; San Diego Supercomputer Center, University of California, San Diego, La Joila, CA. 92093.

* cited by examiner

*Primary Examiner* — Patrice Winder
(74) *Attorney, Agent, or Firm* — Krishnendu Gupta; Joseph D'Angelo

(57) ABSTRACT

A method, system, and apparatus for sending a request for data to a worldwide name node; wherein the worldwide name node is communicatively coupled to worldwide data nodes, sending from the worldwide name node to the worldwide data nodes the request for data; wherein each of the worldwide data nodes serves as an index for a cluster of data, processing at each of the worldwide data nodes the request for information; and returning the result to the world wide name node.

20 Claims, 15 Drawing Sheets

NAME NODES THAT IMPLEMENTS THE DATA DIRECTORY IN DIFFERENT CLUSTERS

ADDRESSING MECHANISM FOR DATA AT WORLD WIDE SCALE

RELATED APPLICATIONS AND PRIORITY CLAIM

This Application is a Continuation-in-Part of U.S. patent application Ser. No. 13/435,009 entitled "BIOINFORMATICS CLOUDS AND BIG DATA ARCHITECTURE" filed on Mar. 30, 2012, the contents and teachings of which are incorporated herein by reference in their entirety, which application claims the benefit of U.S. Provisional Patent Application Ser. No. 61/578,757 entitled "BIOINFORMATICS CLOUDS AND BIG DATA ARCHITECTURE" filed on Dec. 21, 2011, the contents and teachings of which are incorporated herein by reference in their entirety.

This Application is related to U.S. patent application Ser. No. 13/535,684 entitled "WORLDWIDE DISTRIBUTED FILE SYSTEM MODEL", Ser. No. 13/535,696 entitled "WORLDWIDE DISTRIBUTED ARCHITECTURE MODEL AND MANAGEMENT", Ser. No. 13/535,712 entitled "EXECUTION FRAMEWORK FOR A DISTRIBUTED FILE SYSTEM", Ser. No. 13/535,731 entitled "PARALLEL MODELING AND EXECUTION FRAMEWORK FOR DISTRIBUTED COMPUTATION AND FILE SYSTEM ACCESS", Ser. No. 13/535,814 entitled "WORLDWIDE DISTRIBUTED JOB AND TASKS COMPUTATIONAL MODEL", Ser. No. 13/535,760 entitled "SCALABLE METHOD FOR OPTIMIZING INFORMATION PATHWAY", Ser. No. 13/535,796 entitled "CO-LOCATED CLOUDS, VERTICALLY INTEGRATED CLOUDS, AND FEDERATED CLOUDS", and Ser. No. 13/535,821 entitled "DISTRIBUTED PLATFORM AS A SERVICE", filed on even date herewith, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to Big Data.

BACKGROUND

The amount of data in our world has been exploding. Companies capture trillions of bytes of information about their customers, suppliers, and operations, and millions of networked sensors are being embedded in the physical world in devices such as mobile phones and automobiles, sensing, creating, and communicating data. Multimedia and individuals with smartphones and on social network sites will continue to fuel exponential growth. Yet, the impact this growing amount of data will have is unclear.

SUMMARY

A method, system, and apparatus for sending a request for data to a worldwide name node; wherein the worldwide name node is communicatively coupled to worldwide data nodes, sending from the worldwide name node to the worldwide data nodes the request for data; wherein each of the worldwide data nodes serves as an index for a cluster of data, processing at each of the worldwide data nodes the request for information; and returning the result to the world wide name node.

DESCRIPTION OF DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
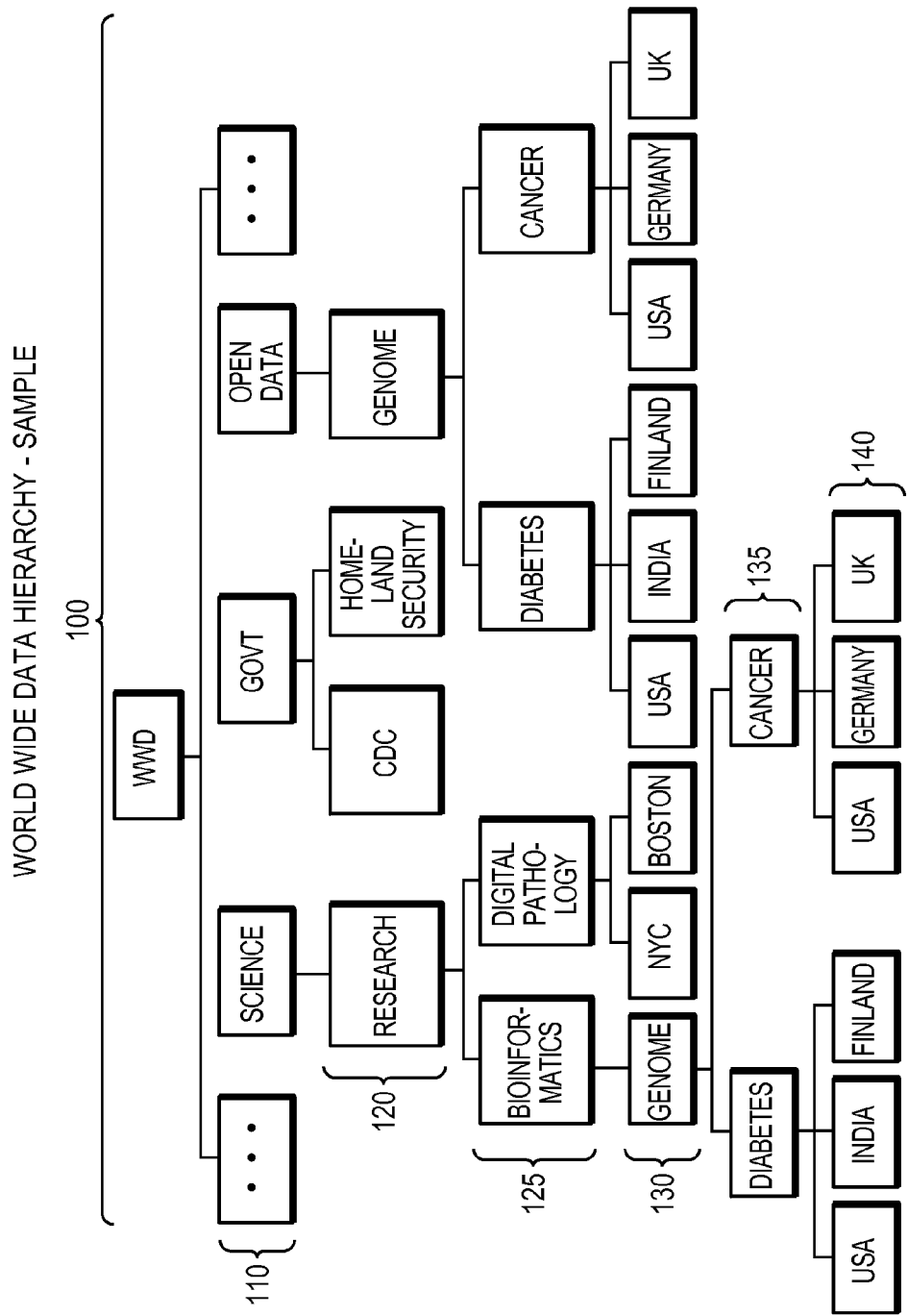
FIG. 1 is a simplified illustration of a worldwide data hierarchy, in accordance with an embodiment of the present disclosure.

In some embodiments, the current disclosure enables managing Data at a World Wide Scale. In an embodiment, the current disclosure enables accessing data in distributed network cluster, where each cluster may have a unique file system. In further embodiments, the current disclosure may enable access to multiple different data or Hadoop clusters through the use of a common access platform. In most embodiments, the current disclosure enables a common methodology to access data regardless of the data type, data classification, data location, current file structure, or configuration in which the data is stored.

In certain embodiments, the disclosure enables creating a system with a hyper link structure to link, organize, index, address, locate, access, link, create and manage data at a World Wide Scale. In at least one embodiment, the techniques described herein may be used via the internet or through any means of communication or as a manual protocol.

In some embodiments, enabling access of data across multiple systems, networks and geographies may be World Wide Data and can be abbreviated as WWD. In certain embodiments, there may be recursive worldwide domain links, where members of the wwd are wwd links. In further embodiments, a hierarchical structure may be enabled that is a cyclic structure of links, which may resemble a graph.

In other embodiments, this may be referred to as "ww data" or w2d, which may refer to "Web To Data." In some embodiments, this may link Web and other disperse network data. In most embodiments, the data may be structured or unstructured and it may contain any type of information, including text, images, videos, and other multimedia. In certain embodiments, it may be enabled to use a Web Browser to view, browse, navigate and manage the hyper links that lead to the data itself and to view the data content. In other embodiments, an ftp client may be used to browse navigate and manage embodiments. In further embodiments, a scp or other type of secure client may be used to view, browse, navigate, and manage the data. In further embodiments, the current disclosure may enable an overlay mechanism on top of the underlying existing web links that groups or aggregates pointers to data sets based on any criteria defined by users or groups of interest to make access and reference to the data easier.

Generally, the World Wide Web may serve as a mechanism to organize, link and manage pages on the internet. Typically, the pages may contain information, including pointers to data sets of a particular type. Conventionally, every site for a publically traded enterprise contains "Investor Relations Information", including the last Security and Exchange Commission (SEC) filings.

Usually, an investor interested in a set of companies S may like to obtain the last SEC filings for them as they have been published on their web sites. Conventionally, it may have been possible to develop an application to access the Web Site for each one of the companies in the set S and programmatically find the link for the last SEC filed. Usually, given that each company in the set S may have a different way to organize the Investor Relations data, it may be quite an investment to access the links.

In some embodiments, this disclosure may enable a system that provides the abstraction of a wwd link, where the wwd link represents a pointer to a set of data that is scattered in a World Wide Scale. In certain embodiments, it may be possible to create a wwd link named, for example, lastAnnualSECforS, that may point to all the last annual SEC filings for all companies in S. In other embodiments, as this data may be available in public domain, the wwd name for the link may be: wwd.lastAnnualSECforS.pbc, where pbc stands for public information. In an embodiment, a user may use a web browser to access the wwd link wwd.lastAnnualSECforS.pbc and the browser would display a list of links, one for each of the last SEC fillings of the companies in S as posted on their web sites.

In some embodiments, "Big Data" may refer to a dataset that has a size, volume, analytical requirements, or structure demands larger than typical software tools may capture, store, manage, and analyze. In certain embodiments, "Big Data" may refer to a dataset that has a combination of attributes, such as size, volume, structure, or analytical requirements, with which typical software tools may not be able to work. In most embodiments, big data is not defined in terms of being larger than a certain number of terabytes rather, as technology advances over time, the size of datasets that qualify as big data may also increase. In certain embodiments, data transfer speed and no of transactions may also attributes of Big Data.

In further embodiments, the definition of "Big Data" may vary by sector or industry, depending on what kinds of software tools are commonly available and what sizes of datasets are common in a particular industry. Big Data may refer to data from Digital Pathology, data from seismological surveys, data from the financial industry, and other types of data sets that are generally too large, for example in size or number of transactions, to be modeled an analyzed with conventional techniques.

Typically, organizations and business units share IT services, which may result in the creation of Big Data. Generally, the network, apps, and servers are shared and/or dedicated in many instances. Usually, of cloud and Big Data models and analytic platforms provide opportunities for the storage business. However, conventional file sizes vary depending on the verticals, domains and type of data. Conventionally solutions provide a good infrastructure to host files that are large in size, but not for smaller files.

For example, a conventional cluster type architecture for big data assumes a flat commodity world, where processing cores and disk drives are cheap and abundant, even though they may and will fail often, applications are computing and data intensive, where computations may need to be done over the entire data set; and in processing Big Data, transfer time becomes the new bottleneck. Traditionally, a Cluster architecture may be based on a set of very simple components and assumes that there are hundreds or thousands of these components together, a node may have a set of processing cores attached to a set of disks, a rack may have a stack of nodes, and a cluster may have a group of racks. Conventionally, within the context of a Cluster, Big Data is typically divided into equal size blocks and the blocks are distributed across the disks in the nodes. Usually, the data in each node may processed by the processing cores in the node providing Data Locality where the data is collocated with the computing node.

Typically, distributed file systems may provide data in a data center to be split between nodes. Generally, a distributed file system may split, scatter, replicate and manage data across the nodes in a data center. Typically, a file system may be a distributed file system when it manages the storage across a network of machines and the files are distributed across several nodes, in the same or different racks or clusters. Conventionally, map reduce may be a computational mechanism to orchestrate the computation by dividing tasks, collecting and re-distributing intermediate results, and managing failures across all nodes in the data center. In certain embodiments, the current techniques may enable data to be split between nodes. In other embodiments, the current techniques may enable computation on data that has been split between nodes.

Conventionally, a distributed file system may a set of equal size blocks. Typically these blocks may be multiples of a simple multiplier, such as 512 kb. Generally, file blocks may be the unit used to distribute parts of a file across disks in nodes. Usually, as disks in a node and nodes in a rack may fail, the same file block may be stored on multiple nodes across the cluster. Typically, the number of copies may be configured. Usually, the Name Node may decide in which disk each one of the copies of each one of the File Blocks may reside and may keep track of all that information in local tables in its local disks. Conventionally, when a node fails, the Name Node may identify the file blocks that have been affected; may retrieve copies of these file blocks from other healthy nodes; may find new nodes to store another copy of them, may store these other copies; and may update this information in its tables. Typically, when an application needs to read a file, may connects to the Name Node to get the addresses for the disk blocks where the file blocks are and the application may then read these blocks directly without going through the Name Node anymore.

Generally, Big Data is Multi Structured and may be conventionally stored, analyzed and managed each type of information in a number of different ways. In some embodiments, structured data may be stored in Block based, SQL, and RDBMS type databases. In other embodiments, semi-structured data may be stored in XML Data Files, in File Based systems, and in Hadoop Map Reduce. In further embodiments, quasi-structured data may be data containing some inconsistencies in data values and formats, e.g., Web clickstream data. In some embodiments, unstructured data may be text documents that could be subject to analytics over text or numbers such as file based data, Hadoop MapReduce, and HDFS data. In other embodiments, unstructured data may be images and video such as file based data, and data streamlined with technologies such as MapReduce, or Scale Out NAS data. Typically, it may be difficult to process information stored in all different formats, cross-analyze content, or visualize and gain insight into the important information spread all over the different formats.

As used herein, for simplicity, a framework for Massive Parallel Processing (MPP) within the delimiters of a Cluster or data set may be referred to as Hadoop by way of example, however any framework may be used and the current techniques are not limited to use with Hadoop. Generally, the Hadoop framework focuses on Massive Parallel Processing (MPP) within the delimiters of a Cluster or data set. Often, Hadoop may be utilized in an attempt to analyze Big Data.

Usually, Hadoop assumes that data or Big Data has been transferred to a single cluster and has been evenly distributed across the nodes of the cluster. Typically, Hadoop does not enable analysis of data across multiple clusters. Conventionally, different parts of the Big Data may reside on different clusters potentially spread across different clouds. Usually, a retail enterprise may need to analyze its sales transactions over the last 5 years, but it may store last four years' transactions in a Public Cloud while retaining the last 12 months in its own Private Cloud. Generally, the enterprise does not have the storage, processing capacity or bandwidth, to repatriate the last four years worth of Big Data to its private cloud. In an embodiment, the current disclosure enables management of big data sets where the content may exist across numerous clouds or data storage centers.

Generally, with respect to the data, there may be two architectural frameworks. Conventional architecture design may assume that there are three main types of hardware resources to be managed, servers, enclosing very expensive processors that should not be idle at any moment in time, storage Arrays, enclosing drives of different performance and capacity ranging from Solid State Drive (SSD) to Fiber Channel and SATA, and Storage Area Network (SAN), connecting a set of servers to a set of storage arrays. Generally, this architecture may assumes that most applications are "computing intensive" meaning that there will be high demand for processing power that performs computation on a subset of all the data available for the application, which may be transferred across the SAN to the servers.

In some embodiments, World Wide Hadoop (WWH) or other big data processing methodologies may enable Massive Parallel Processing (MPP) to be executed across multiple clusters, and clouds without requiring one or more Big Data sets to be located at the same location. In certain embodiments, WWH may have a layer of orchestration on top of Hadoop or a similar architecture that manages the flow of operations across clusters of nodes. In other embodiments, the clusters maybe separate across metro or worldwide distances. In further embodiments, the current techniques may enable World Wide Hadoop (WWH) to enable Genome Wide Analysis (GWA) of Genomes that reside on different Genome Banks, one located in NY and another located in MA.

In certain embodiments, World Wide Hadoop may be applied where big data clouds exist. In certain embodiments, clouds may be extension of the other clouds. In other embodiments, clouds may be an independent cloud. In further embodiments, clouds may be providing an analysis services to other clouds. In some embodiments, the big data clouds may exchange raw data or analyze data for further processing. In certain embodiments, the domain expertise, open data, open science data, analysis etc, may come from different geographic locations and different clouds may host the respective big data. In at least some embodiments, the federation among big data clouds may present an internet infrastructure challenge.

In some embodiments, factors like cost and bandwidth limit may affect the big data Hadoop deployment federation. In certain embodiments, the current techniques may model Hadoop environments. In other embodiments, the current techniques may re-define roles of the Hadoop components in the Hadoop clusters. In certain embodiments, Massive Parallel Processing may be enabled across clouds. In some embodiments, WWH concepts apply where there are many big data clouds, and the clouds may need to either exchange raw data or analyze data for further processing. In some embodiments, as used herein, a cluster may be used interchangeably with a data center.

In certain embodiments, the current disclosure may be able to utilize the concepts, frameworks, and modeling abstractions defined in APPLICATIONS to implementing World Wide Scale Frameworks to enable analysis of multiple big data sets, which may be in geographically disperse locations. In certain embodiments, this may include executing tasks close to the data source. In other embodiments, it may enable executing tasks in nodes located in the data path, at intermediate points of the data path, to reduce the amount of data to be exchanged. In further embodiments, the amount of data traveling towards a destination may be reduced by performing calculations close to where the data is located. In some embodiments, the data may further be reduced by performing aggregate calculations as data is combined as it travels towards the destination of the data.

In at least some embodiments, devices may be strategically located in the information pathway to execute some of these tasks close to the data source. In other embodiments, strategically located technologies that are in the information pathway to execute the tasks may enable computation close to the data source. In certain embodiments, Intermediate World Wide Task Trackers may be implemented by servers, by network devices, such as routers and switches, and by processing capacity inside storage devices. In at least one embodiment, Intermediate World Wide Task Trackers may be implemented as virtual machines that may run on any processing units available in the storage, network, or processing units in the information pathway.

The following list of acronyms may be useful in understanding the terms use here in:
- WW—World Wide
- WWH—World Wide Hadoop
- DNN—Distributed Name Node
- DDN—Distributed Data Node
- MPP—Massively Parallel Processing
- SSD—Solid State Drive
- GWA—Genome Wide Analysis
- FS—File System
- WWDFS—World Wide Distributed File System
- DFS—Distributed File System
- HDFS—Hadoop Distributed File System
- WWHDFS—World Wide Hadoop Distributed File System
- WWF—World Wide File
- WWN—World Wide Name
- WWFN—World Wide File Name
- WWS—World Wide Scale
- WWJT—World Wide Job Tracker
- WWTT—World Wide Task Tracker
- WWA—World Wide Addressing
- WWD—World Wide Data Data Model In most embodiments a data model or modeling structure may be used to process data across clusters. In most embodiments, the data model may enable representation of multiple data sets. In certain embodiments, this model may include data notes, data clusters, data centers, clouds, and skies.

In most embodiments, the classes, objects, and representations referenced herein may be an extension of known distributed system models, such as the EMC/Smarts Common Information Model (ICIM), or similarly defined or pre-existing CIM-based model and adapted for the environmental distributed system, as will be discussed. EMC and SMARTS are trademarks of EMC Corporation, Inc., having a principle place of business in Hopkinton, Ma, USA. This exemplary model is an extension of the DMTF/SMI model. Model based system representation is discussed in commonly-owned U.S. patent application Ser. No. 11/263,689, filed Nov. 1, 2005, and Ser. No. 11/034,192, filed Jan. 12, 2005 and U.S. Pat. Nos. 5,528,516; 5,661,668; 6,249,755 and 6,868,367, and 7,003,433, the contents of all of which are hereby incorporated by reference. An example of a Big Data Set may be found in commonly-owned U.S. patent application Ser. No. 12/977,680, filed Dec. 23, 2010, entitled "INFORMATION AWARE DIFFERENTIAL STRIPING" the contents of which are hereby incorporated by reference. An example of modeling Big Data Set may be found in commonly-owned U.S. patent application Ser. No. 13/249,330, filed Sep. 30, 2011, and entitled "MODELING BIG DATA" the contents of which are hereby incorporated by reference. An example of analyzing Big Data Set may be found in commonly-owned U.S. patent application Ser. No. 13/249,335, filed Sep. 30, 2011, and entitled "ANALYZING BIG DATA" the contents of which are hereby incorporated by reference.

Generally, referred-to US Patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific Big Data set for which the associated managed component problems may propagate through the analyzed system and the symptoms associated with the data set may be detected an analyzed. An analysis of the symptoms detected may be performed to determine the root cause—i.e., the source of the problem—of the observed symptoms. Other analysis, such as impact, fault detection, fault monitoring, performance, congestion, connectivity, interface failure, in addition to root-cause analysis, may similarly be performed based on the model principles described herein.

Addressing Mechanisms

In certain embodiments, the current disclosure may enable a World Wide addressing mechanism for multiple types of Big Data. In a first embodiment, wwd.genome.sci may be a link to Genome banks are available for scientific queries and research. In another embodiment, wwd.genome.sci/autism may be a link to the subset of wwd.genome.sci that focus on the study of autism. In certain embodiments, wwd.genome.sci includes the link wwd.genome.sci/autism and may be a recursive link.

In some embodiments, wwd.seismic.sci may be a link to the Seismic data banks that are available for scientific queries and research. In at least one embodiment, the current disclosure may enable a wwd registration mechanism to for management and control inclusion of data in a given wwd link. In an embodiment, the registry may be automated. In another embodiment, curators may be assigned to review the data format and cleanse the data before it is inserted into a link. In some embodiments, the registration may use an open community for voting and cleansing the data. In further embodiments, the registration proves may be semi-open where only people with the right credentials may cleanse and curate the data.

In some embodiments, the current disclosure may enable creating a program to automatically browse all the web sites on the internet to find or mine data based on its semantics, context and/or xml "tag." In further embodiments, links to these ww data may be automatically created. In certain embodiments, a wwd link may be used as a mechanism to address Data at World Wide scale in the context of the World Wide Massive Parallel Processing (MPP) and World Wide Execution Frameworks. In other embodiments, a wwd may be used to name and refer to a Domain in the context of the World Wide Distributed File System.

In some embodiments, World Wide Data (WWD) Hierarchy may be connected to the DNS system built for the World Wide Web. In other embodiments WWD may use and extend the platform used to invoke a search for the data in the DNS system. In some embodiments, a search for wwd. genome.sci may fetch (find and reads) the genomic science related data. In other embodiments, a search for wwd. genome.diabetes.opendata may fetch the genomic related to diabetes published by open data community. In further embodiments, a search for wwd. genome.cancer.usa.sci may fetch the cancer related genomic data published by scientific community in USA.

Refer now to the example embodiment of FIG. 1 which illustrates a simple World Wide Data Hierarchy. In this embodiment, world wide data and how sub categories may be accessed is illustrated in 100. WWD gives access to the set of data. A combination such as WWD.science 110 gives access to the data categorized as science within the model. Further specifying wwd.science.research 120 further refines the data available to that of the research categorization within science. Further specifying wwd.science.researchbioinformatics 125 further narrows the search to that of bioinformatics. Specifying additional information, such as genome 130, cancer 135, and UK 140 would lead one to the UK's cancer genome bioinformatics research in science. Other data within the WWD may also be accessed by specifications according to the categorizations in the chart. Note, however, this is only a sample representation and there are many other possible embodiments and characterizations. Note as well the . . . indicated further branches of the chart which may indicate other categorizations.

In most embodiments, the categorization, such as that of FIG. 1, may represent the categorization of the data but may be divorced from the location of the data. In certain embodiments, the chart may represent the necessary metadata to categorize and locate the data and may have no relationship to the physical location of the data. In some embodiments, the data may be scattered across many disparate geographic locations and the categorization may enable access to and analysis of the data.

Figure 2:
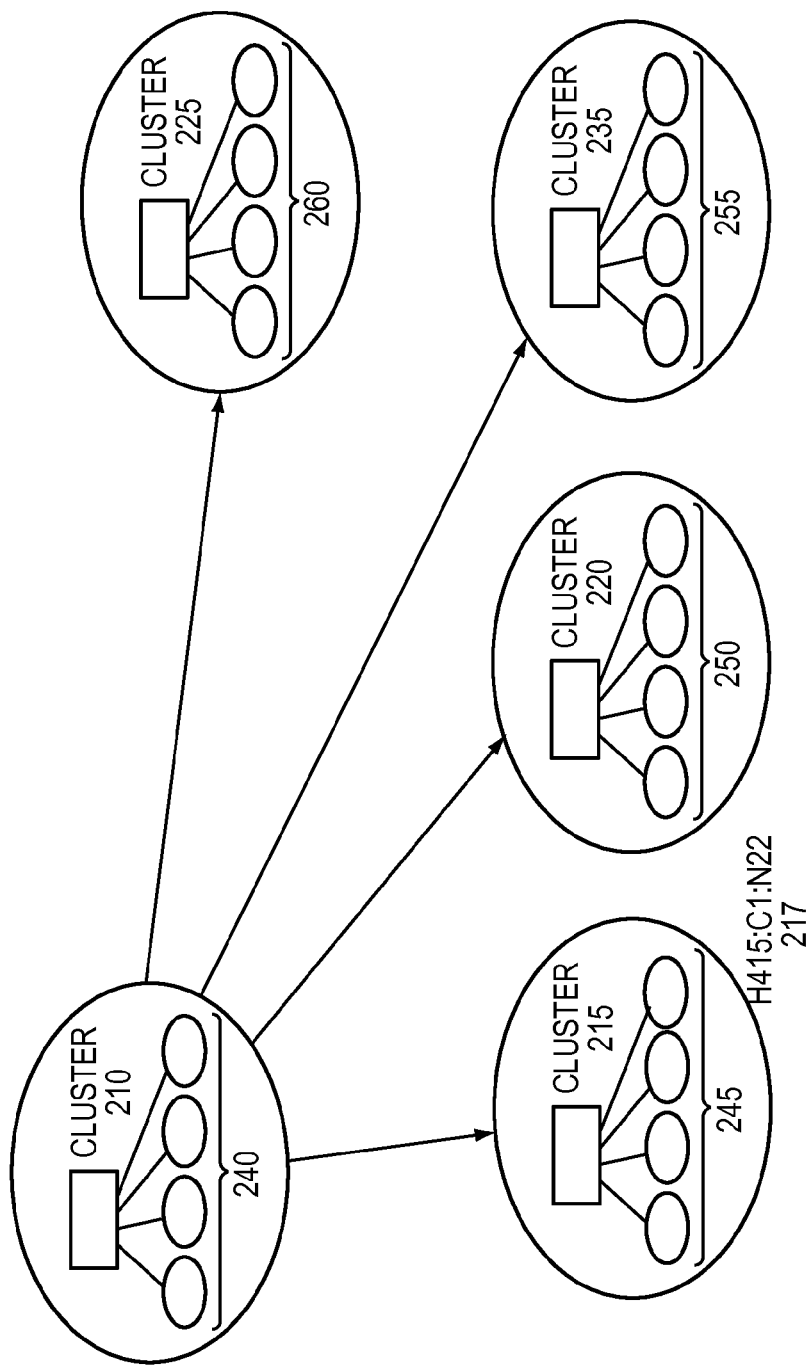
FIG. 2 is a simplified illustration data clusters, in accordance with an embodiment of the present disclosure.

Refer now to the example embodiment of FIG. 2. In the example embodiment of FIG. 2, there are five data clusters 210, 215, 220, 225, and 235. These clusters represent data stores. The data stores may be physical or logical data stores and in certain embodiments may be hadoop clusters. Each cluster has a name or categorization node and storage nodes such as 245 for cluster 215. The categorization of the chart of FIG. 1 may be layered over the data stores or data clusters of FIG. 2. In FIG. 2, each cluster may be located in a geographically disperse location. In certain embodiments, each cluster itself may be layered over one or more other clusters.

Refer now to the example embodiment of Table 1 below which gives an example embodiment of the relationship of the categorizations of FIG. 1 being layered over the physical or virtual representation of the clusters of FIG. 2. In some embodiments, the layering may be referred to as the World Wide Data Directory for a name space.

The columns of Table 1 represent the namespace for the cluster, i.e. the information categorization to be accessed, the cluster and data node name, i.e. the location of the cluster and the name node within that cluster and the node containing the information, and the link to the next cluster, i.e. if there is more information on this categorization or namespace in another cluster. In Table 1, the information for sci.genome.diabetes is contained in cluster H415 with name node N1. Conversely, only some of the information for the namespace or categorization for opendata.edu.oceanics is contained in Cluster 415. There is further information about this categorization listed at cluster H420.

TABLE 1

| Namespace for Cluster H1:C1 | Cluster and Data Node Name | Link to next cluster |
|---|---|---|
| Govt.cdc.vaccine | H415:C1:N23, H415:C1:N345, H415:C1:N564 | — |
| sci.genome.diabetes | H415:C1:N1 | — |
| Opendata.edu.occeanics | H415:C1:N22 | H420:C9* |

*Indicates there is more data in a different cluster

Refer now to the example embodiment of FIG. 2 below. Table 2 represents the World Wide Data Directory for name space for Cluster 420. Table 2 indicates that opendata.edu.oceanics has further information specified at H420 nodes 12 and nodes 99.

TABLE 2

| Namespace for Hadoop Cluster H23:C9 | Cluster and Data Node Name | Link to next Hadoop cluster |
|---|---|---|
| Opendata.edu.occeanics | H420:C9:N12, H420:C9:N99 | — |

Figure 3:
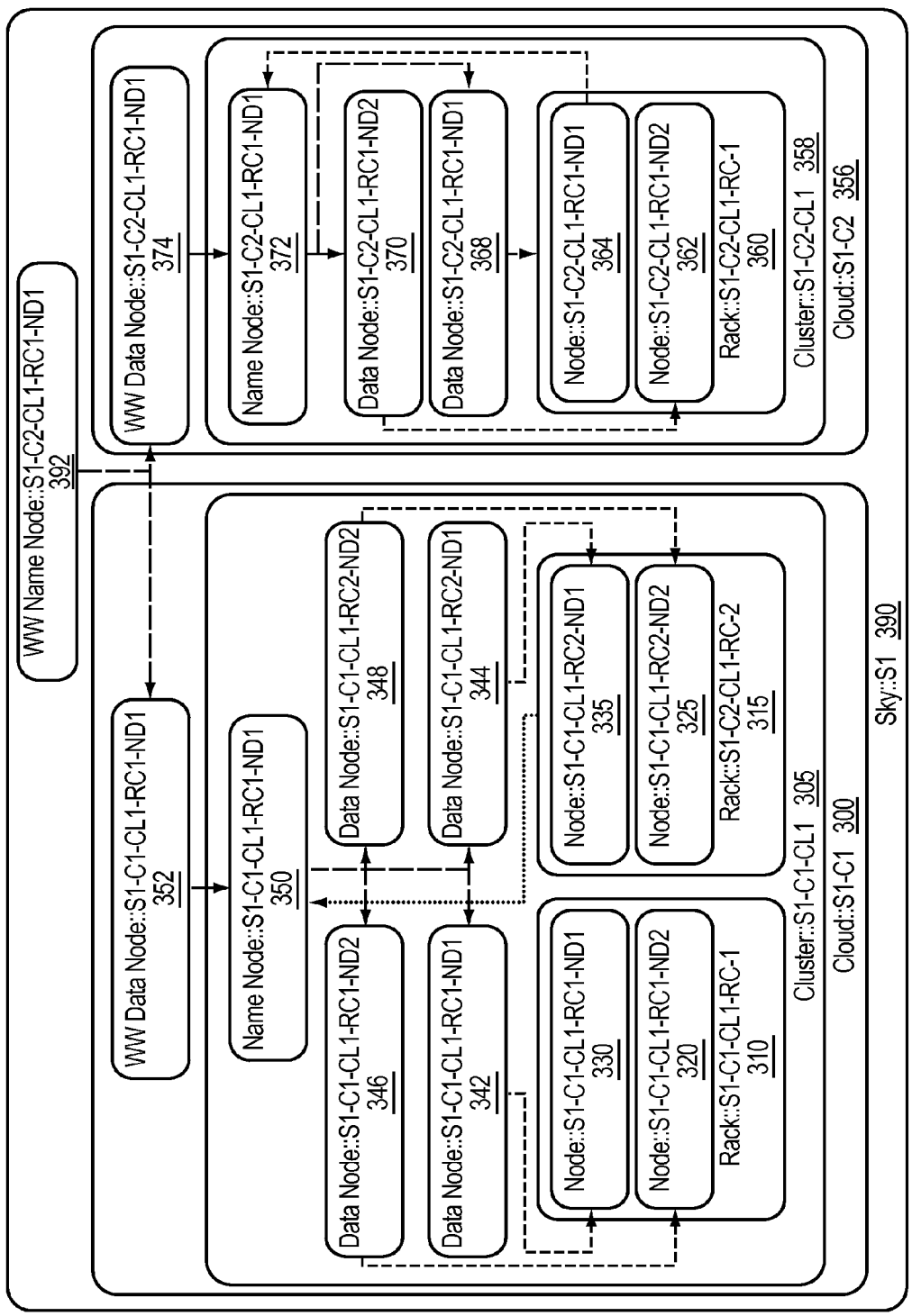
FIG. 3 is an alternative embodiment of FIG. 2 simplified illustration representing a sky with a cluster, which contain racks, which contains nodes, with name nodes implementing the data structure in different clusters, in accordance with an embodiment of the present disclosure.

Refer now to the example embodiment of FIG. 3, which illustrates a sample relationship between Cloud and WW entities and is an alternative representation of FIG. 2. Sky 390 contains two clouds, cloud 365 and cloud 300, and WW JOB 392. Cloud 300 contains of Cluster 305 and WW Data node 353. Cluster 305 contains of four data nodes, 342, 344, 346, and 346. Cluster 305 also contains name node 350. Cluster 305 also contains racks 310 and 315. Each rack, such as 310 contains nodes, such as nodes 320 and 330. Data node 346 is assumed by node 320. Data node 342 is assumed by node 330. Data node 348 is assumed by node 325. Data node 344 is assumed by node 335. Node 335 is assumed by name node 350. Data node 346 tracks data node 348 and vice versa. Data node 342 tracks data node 344 and vice versa. WW Data node 352 tracks Name node 350. FIG. 3 represents a particular embodiment of the relationships between a wwname node, name nodes, data nodes, nodes, racks, clusters, clouds and a sky.

Refer now to the example embodiment of Table 3. Table 3 represents sample errors and the associated description for the errors for a WWD request for data, i.e. the errors provided when a WWD data request fails.

Errors and Exceptions as a response from the WWD requests

TABLE 3

| Error | Description |
|---|---|
| Data Not Found | WWD and WWH could not find the requested data |
| Invalid Request | Request doesn't comply the WWD and WWH rules |
| Cannot Read Data | Cannot read data because data is too big to transmit, or the transport infrastructure has limitations |
| Cannot Execute Code | The application that is requested to execute in the WWH cluster cannot be executed |
| Request Timed Out | Either read or execute request timed out. Try expanding request wait time |

Figure 4:
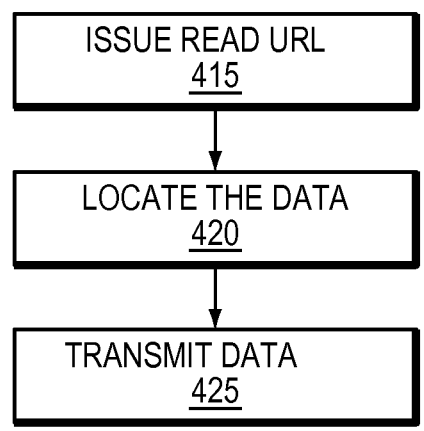
FIG. 4 is a simplified method for locating data in a worldwide data hierarchy, which contains nodes, outlining the relationship between a cloud and WW entities, in accordance with an embodiment of the present disclosure.

Refer now to the example embodiment of FIG. 4, which illustrates reading data from a WWH location using WWD. In this embodiment a user desires to get the scientific related data for analysis. The user issues a read WWD.sci URL (step 415). WWH and WWD infrastructure (name nodes) use DNS and gateways to locate the scientific data (step 420). WWH name node transmits data using http and/or https protocols (step 425). In certain embodiments, an end of data message may be sent at the end of the data. In this embodiment, URL is used as the string to find the data but in other embodiments many other types of access protocols may be used instead of URL.

Figure 5:
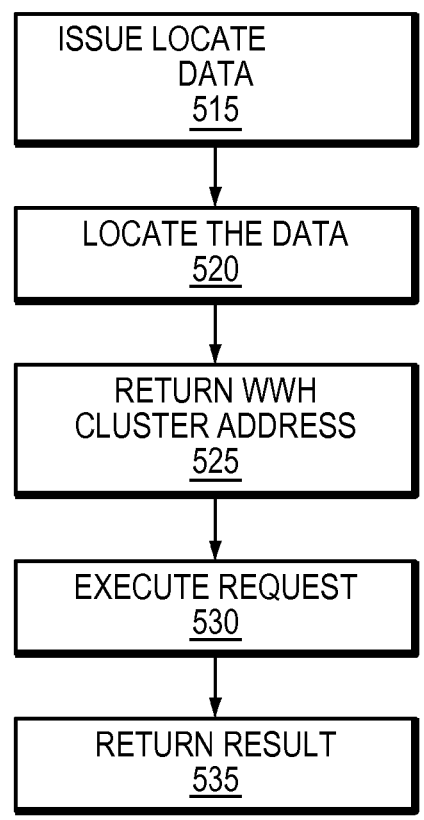
FIG. 5 is a simplified method for getting data in a worldwide data hierarchy, in accordance with an embodiment of the present disclosure.

Refer now to the example embodiment of FIG. 5, which illustrates locating data using WWD and sending an application or algorithm to the place where data resides for analysis. User needs to locate the scientific related data and send an application (executable for an algorithm) to do an analysis since it is big data to move data to a different location. User issues locate WWD.sci URL (step 515). WWH and WWD infrastructure (name nodes) uses DNS and gateways to locate the scientific data (Step 520). WWH cluster address is sent back to the user (step 525). User sends an application to the WWH cluster with an execute request (step 530). Result is send back to the user (step 535). In some embodiments, an end of data message is sent at the end of the data.

Optimizing Information Pathway

In certain embodiments, WWD may be located in several different geographic locations. In most embodiments, the WWD in any particular node or cluster may be large enough that it is not possible to move the data for analytics or examination. In many embodiments, it may be beneficial to execute analytics as close to the data as possible. In some embodiments, execution may take place at clusters within WWD. In other embodiments, the analysis may occur when an application or algorithm is sent for execution to the cluster. In most embodiments, executing of tasks may occur close to the data source.

In certain embodiments, execution of tasks may occur at intermediate points in the data path. In further embodiments, the data may be reduced as the data travels towards its destination. In at least one embodiment, devices may be strategically located in the data path and leveraged to reduce data flow through execution of tasks or analysis. In other embodiments, World Wide Task Trackers may be implemented by servers, by network devices, such as routers and switches, and by processing capacity inside storage devices themselves. In at least some embodiments, objects such as a World Wide Task Trackers may be implemented as virtual machines that run on any processing units available in the storage, network, or processing units in the information pathway.

In an embodiment, the current disclosure may enable defining and modeling a graph representation of a Sky abstraction. In certain embodiments, nodes in this embodiment may be considered clouds. In some embodiments, links may represent connectivity between the clouds. In other embodiment, to be connected the Clouds may need to belong to the same Sky. In an embodiment, links in the graph may represent Data Pathways from World Wide Task Trackers to World Wide Job Trackers, where certain World Wide Task Trackers may assume the role of intermediate steps on the way to the Job Tracker.

In some embodiments, a graph layout may consider physical distance, bandwidth constraints and other criteria that may influence information movement. In another embodiment, when a World Wide Job Tracker decomposes a World Wide Job into World Wide Tasks, it may create a World Wide Data Pathway Graph to represent the potential path through which data will flow in the graph. In other embodiments the World Wide Job tracker may designate certain World Wide Task Trackers as intermediate steps.

In further embodiments, the graph may be distributed to all World Wide Task Trackers as part of the World Wide Task assignment. In at least one embodiment, upon completing a World Wide Task, a World Wide Task Tracker may send the results to the next node as defined by the graph as opposed to the World Wide Job Tracker. In some embodiments, Intermediate World Wide Task Trackers may collect the intermediate results. In further embodiments, the World Wide Task Trackers may call the Reduction function on these results. In at least one embodiment, the World Wide task Trackers may send the result to the next node in the graph.

Consider a sample embodiment where a World Wide Map Reduce activity calculates the maximum value of a series of numbers. In this embodiment, the calculations may be "partitioned." In an embodiment, the calculations may be applied to the entire data set. In another embodiment, the calculations may be applied to the data set as divided into subgroups, where the operation may be applied to each subgroup, the intermediate results may then be grouped together, and the operation may be applied to the sub group of information to obtain the final result. In most embodiments, the final result may be the same as if the operation had been applied to the entire data set to start or if the calculation was partitioned.

Figure 6:
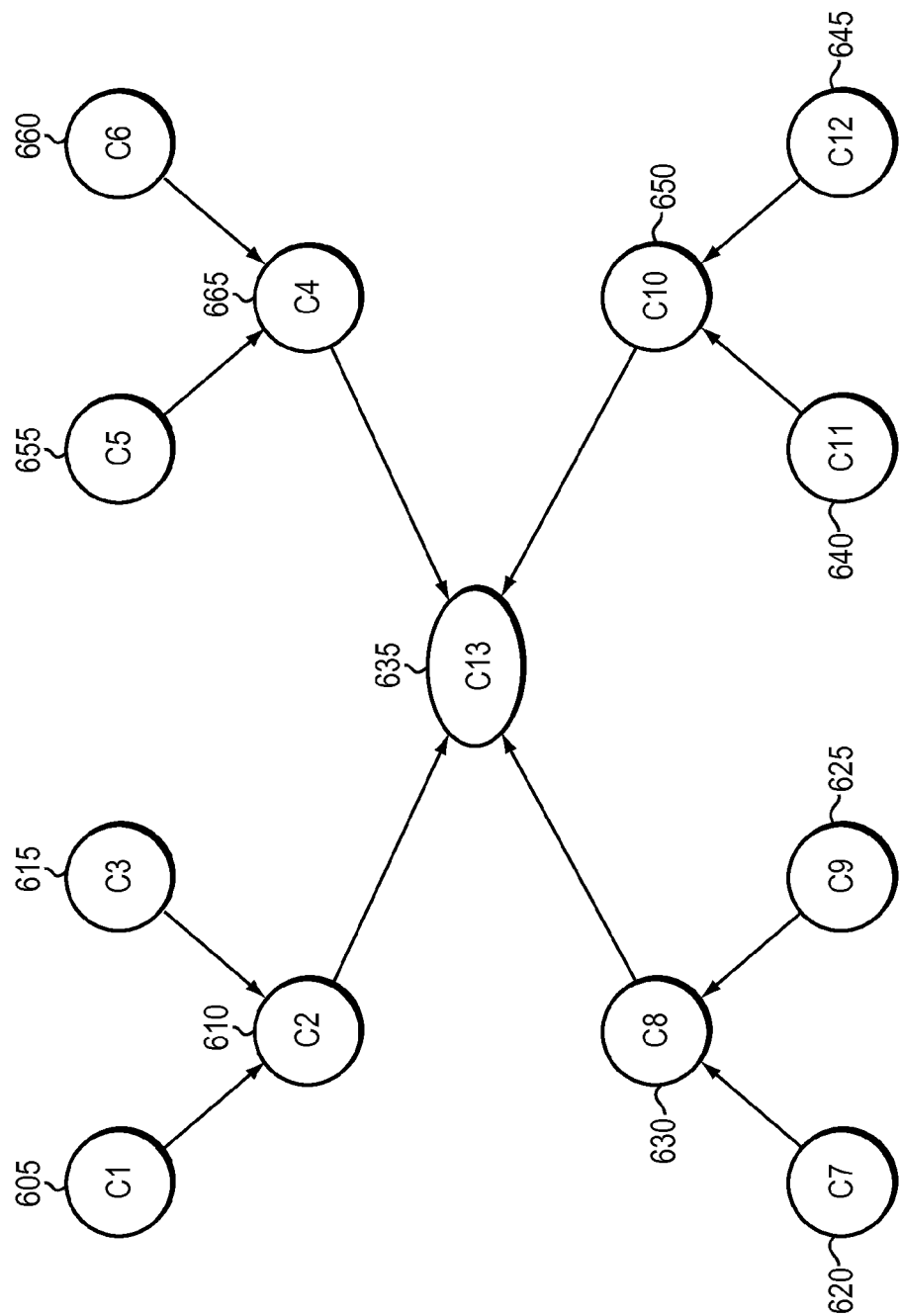
FIG. 6 is a simplified illustration of geographically disperse data nodes and clusters, in accordance with an embodiment of the present disclosure.
Figure 7:
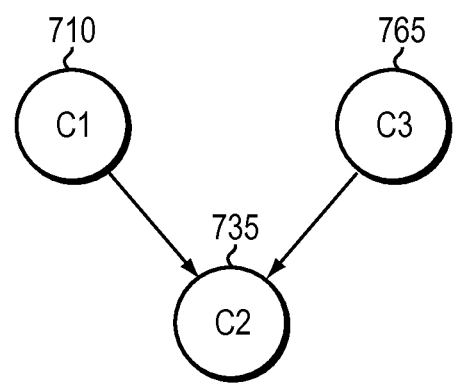
FIG. 7-10 represent simplified illustrations dividing the geographically disperse data nodes and clusters, in accordance with an embodiment of the present disclosure.
Figure 8:
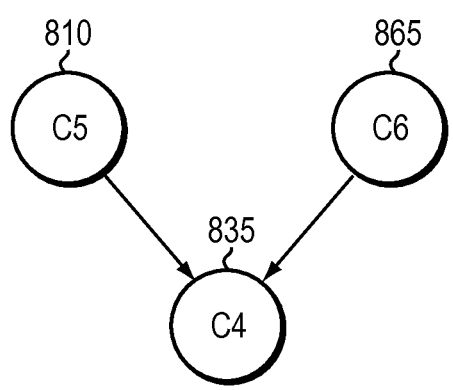

Refer now to the example embodiment of FIG. 6. In this example embodiment, the sub-groups of the numbers are located in 12 Clusters (C1 605, C2 610, ... C12 645), where Clusters C1 605, C2 610, and C3 615 are located in South America, Clusters C4 665, C5 655, and C6 660 are located in North America, Clusters C7 620, C8 630, and C9 625 are located in Asia, and Cluster C10 650, C11 640, and C12 645 are located in EMEA. The World Wide Job Tracker is located in Africa on Cluster C13 635. In this example, the World Wide Job Tracker defines the World Wide Data Pathway Graph as follows, where C2 610, C4 665, C8 630, and C10 650 are Intermediate World Wide Task Trackers.

The example embodiments of FIGS. 7-10 represent the example embodiment of FIG. 6 divided for intermediate processing. Refer now to the example embodiment of FIG. 7. C1 710 is connected to C2 735, C3 765 is connected to C2 735. C2 735 is the sub-group reduce node which collects results from sub groups and consolidates them.

Data resides at edge node c3 765 where computations happen. Refer as well to the example embodiment of FIG. 8. NC5 810 is connected to C4 835, C6 865 is connected to C4 835. C4 835 is the sub-group reduce node which collects results from sub groups and consolidates them. Data resides at edge node c6 865 where computations happen.

Figure 9:
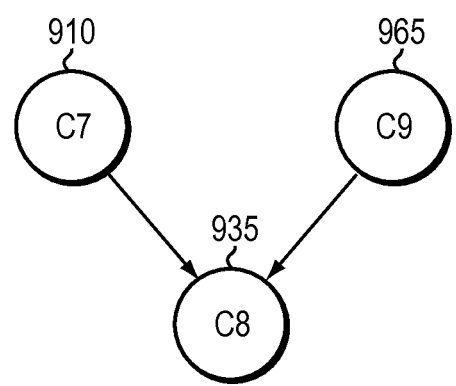
Figure 10:
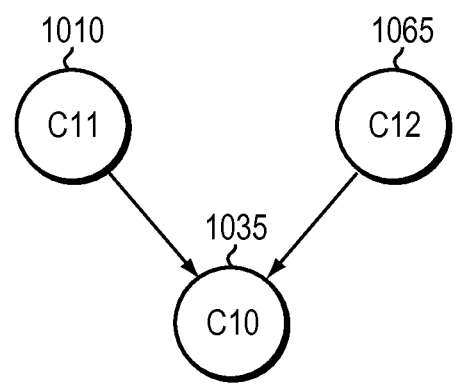

Refer as well to the example embodiment of FIG. 9. C7 910 is connected to C8 935, C9 965 is connected to C8 935. C8 935 is the sub-group reduce node which collects results from sub groups and consolidates them. Data resides at edge node C9 965 where computations happen. Refer as well to the example embodiment of FIG. 10. C11 1010 is connected to C10 1035, C12 1065 is connected to C10 1035. C10 1035 is the sub-group reduce node which collects results from sub groups and consolidates them. Data resides at edge node c12 1065 where computations happen.

Referring to FIG. 7-10, results from task execution flow from C1 710 and C3 765 to C2 735. Results flow from C5 810 and C6 865 to C4 835. Results flow from C7 910 and C9 965 to C8 935. Results from C11 1010 and C12 1065 flow to C10 1035.

Figure 11:
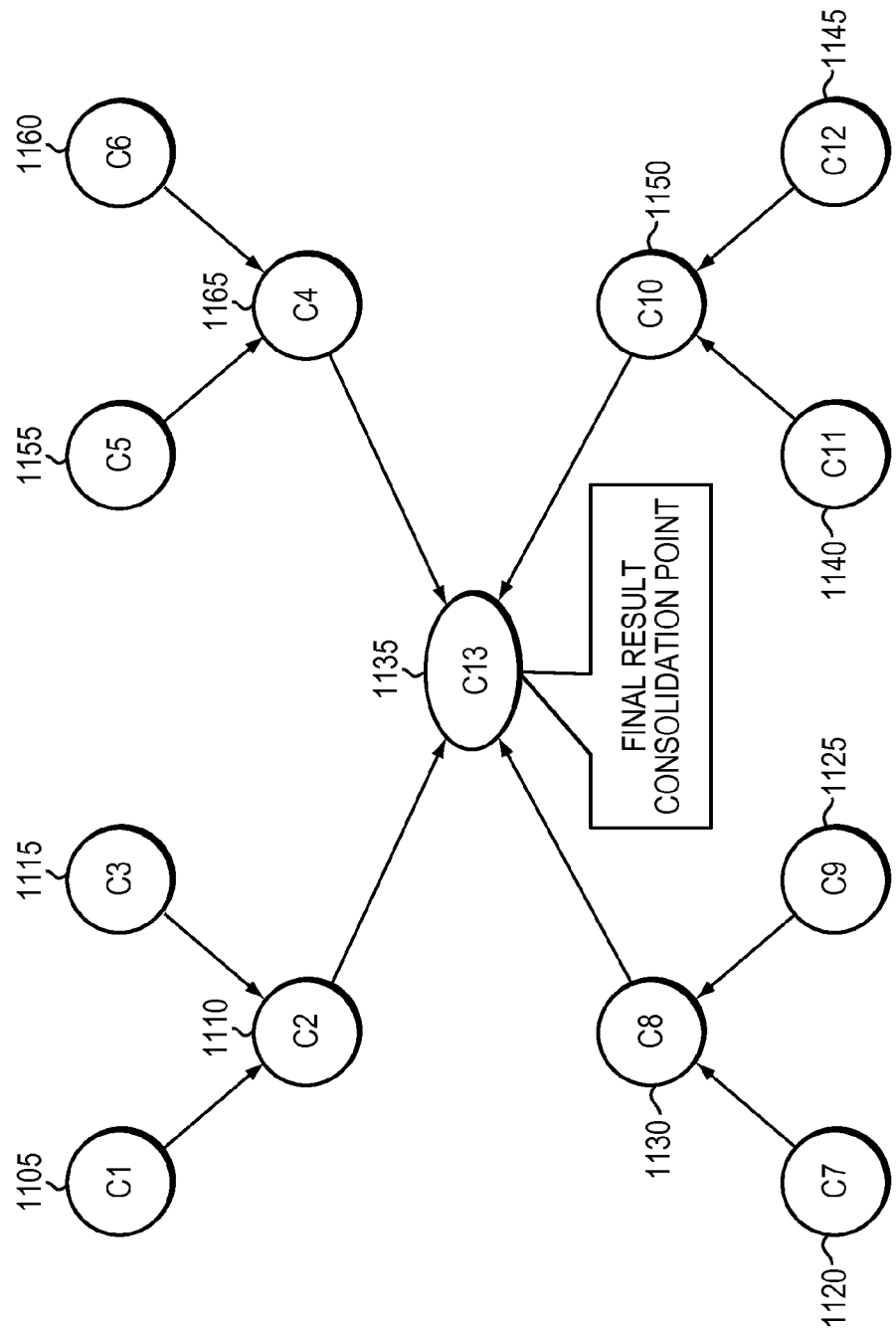
FIG. 11 is a simplified illustration of consolidating data calculations of sub-nodes and clusters, in accordance with an embodiment of the present disclosure.

Refer now to the example embodiment of FIG. 11. In this embodiment the intermediate nodes, C2 1110, C4 1165, C8 1130, and C10 1150, execute the reduce function and calculate the max among its set of results. C2 1110, C4 1165, C8 1130, and C10 1150, send the results to C13 1135, which calculates the final max value.

Figure 12:
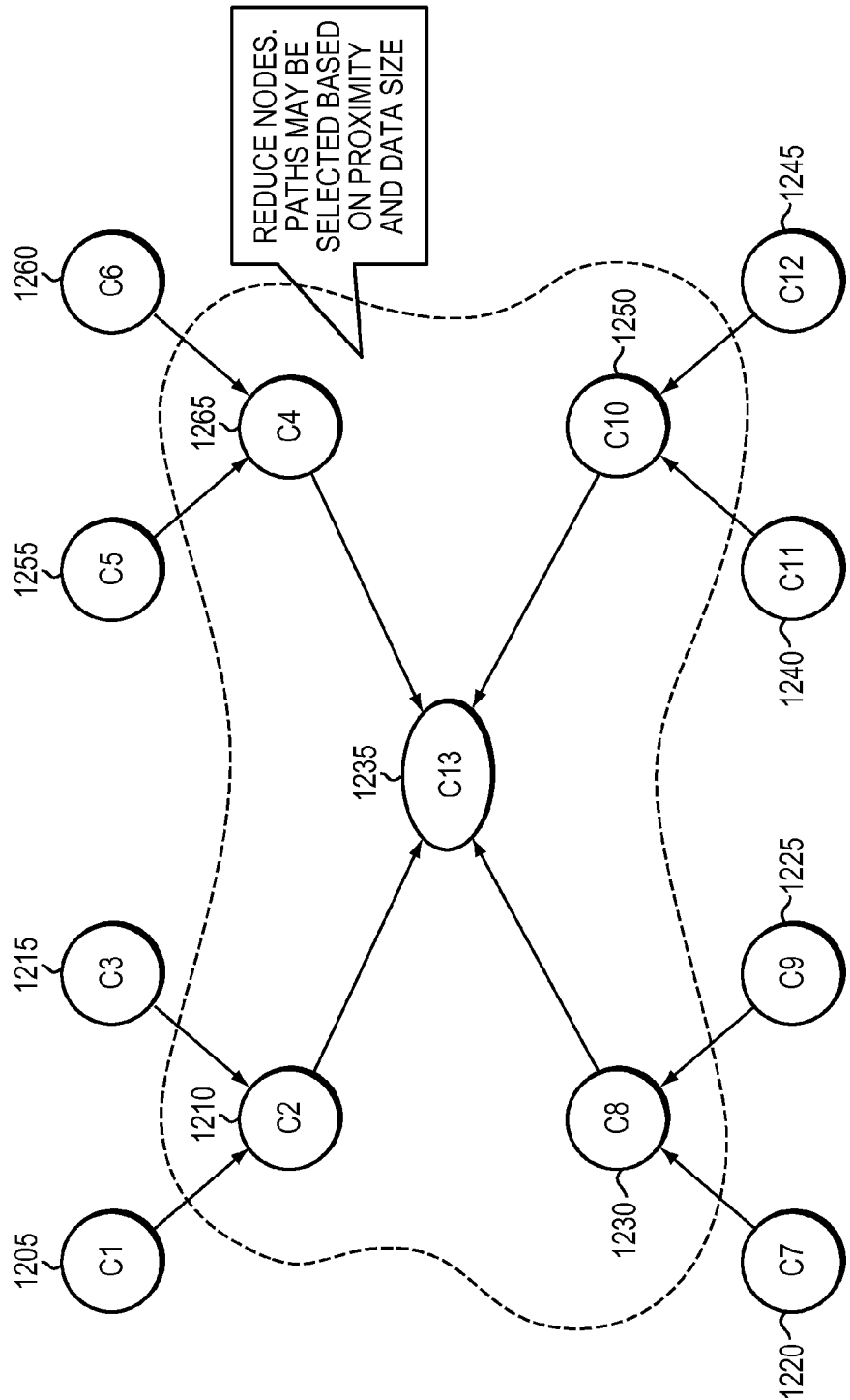
FIG. 12 is a simplified illustration of reduce nodes and pathways being selected based on proximity and data size, in accordance with an embodiment of the present disclosure.

Refer now to the example embodiment of FIG. 12. In the example embodiment of FIG. 12, the reduce nodes and paths may be selected based on proximity and data size. In other embodiments, the partitions and intermediate nodes may be selected based on processing ability. In certain embodiments, the processing nodes may be based on the amount of data in the cluster. In further embodiments, the processing nodes may be based on transmission speed between the nodes and consolidation node.

Figure 13:
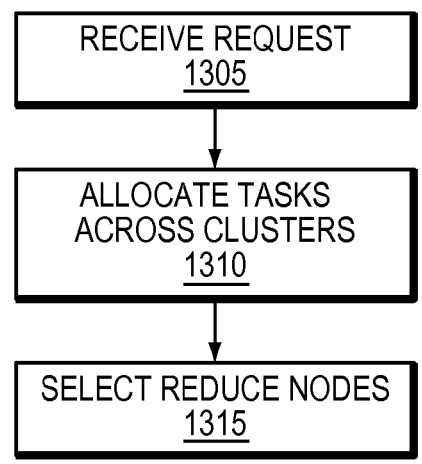
FIG. 13 is a simplified method of optimizing map a pathway, in accordance with an embodiment of the present disclosure.

Refer now to the example embodiment of FIG. 13. WWH framework is requested to execute a job where the data is dispersed many clusters 1305 (step 1305). WWH job tracker allocates tasks across clusters (step 1310). WWH and WWD infrastructure (name nodes) selects reduce nodes (step 1315). In certain embodiments, immediate reduce data nodes may come from near location or within the cluster where the task is executed. Sub-reduced results may need further consolidation. WWH provides mechanism to select data node which could be used consolidate results.

Figure 14:
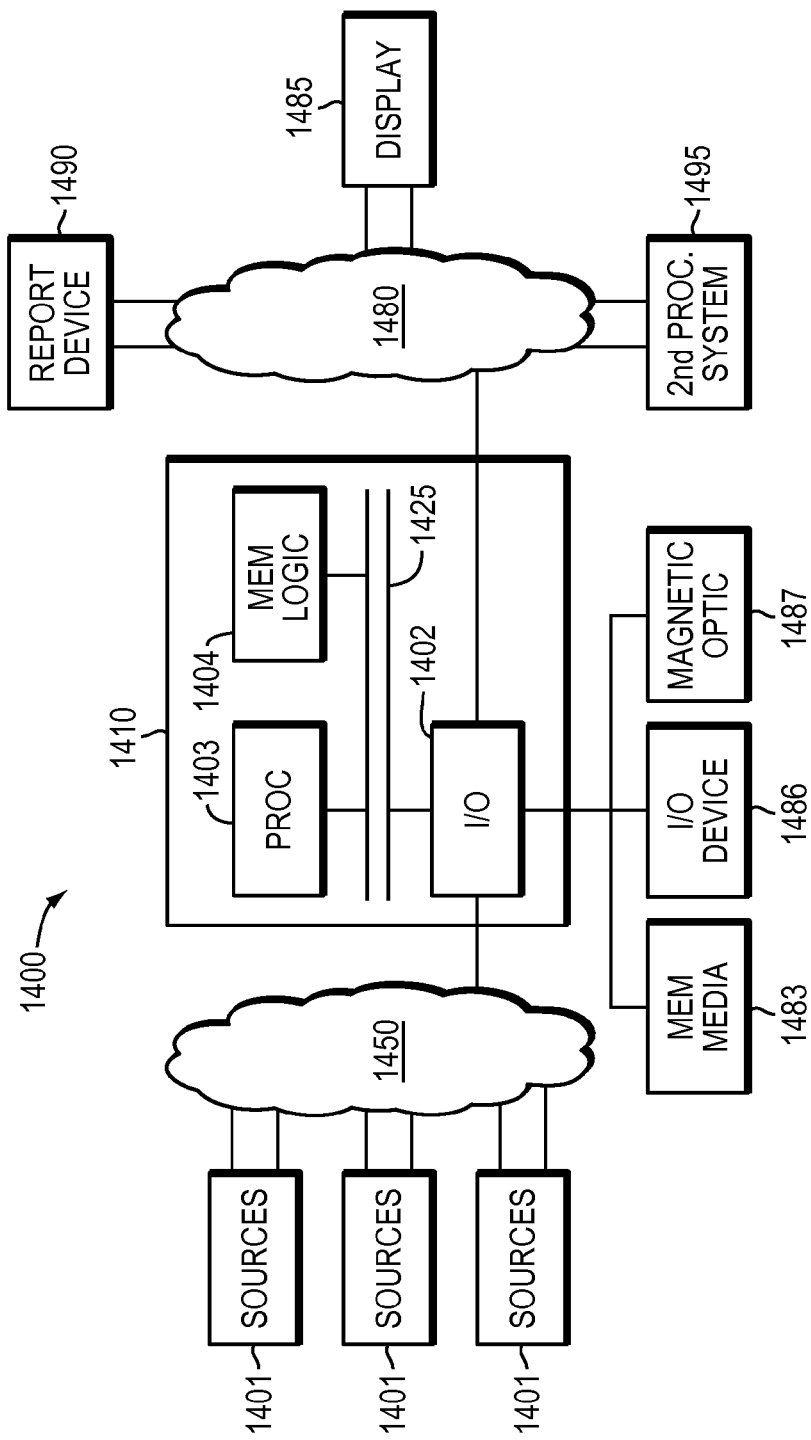
FIG. 14 is an example of an embodiment of an apparatus that may utilize the techniques described herein, in accordance with an embodiment of the present disclosure.
Figure 15:
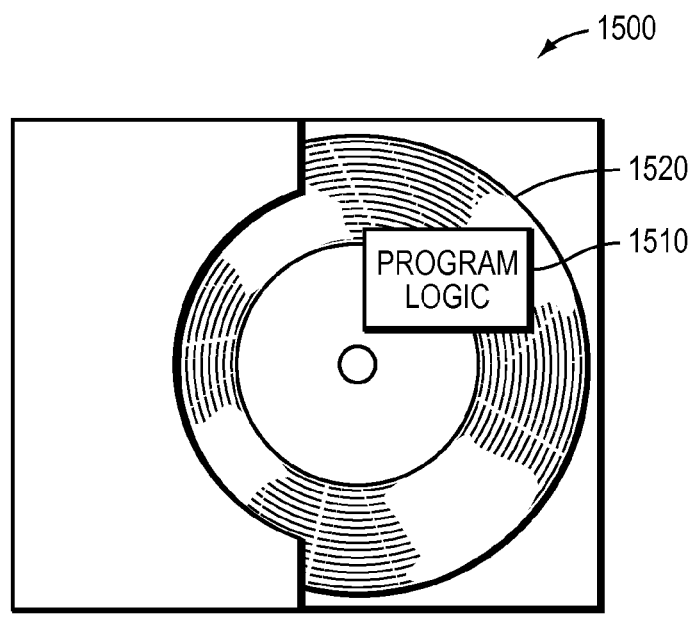
FIG. 15 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor 1403 to provide a unique apparatus that operates analogously to specific logic circuits. As such a general purpose digital machine can be transformed into a special purpose digital machine. FIG. 15 shows Program Logic 1534 embodied on a computer-readable medium 1530 as shown, and wherein the Logic is encoded in computer-executable code configured for carrying out the reservation service process of this invention and thereby forming a Computer Program Product 1500. The logic 1434 may be the same logic 1440 on memory 1404 loaded on processor 1403. The program logic may also be embodied in software modules, as modules, or as hardware modules.

The logic for carrying out the method may be embodied as part of the system described below, which is useful for carrying out a method described with reference to embodiments shown in, for example, FIG. 1 and FIG. 4. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method for accessing worldwide comprising:
    sending a request for data to a worldwide name node; wherein the worldwide name node is communicatively coupled to worldwide data nodes; wherein a worldwide data hierarchy is layered over the worldwide name node and worldwide data nodes; wherein the worldwide data hierarchy classifies data distributed across the worldwide data nodes into categories according to the type of data stored on the worldwide data nodes; wherein the classification of the data into categories of the worldwide hierarchy is enabled to be unrelated to the underlying location of the data; wherein the worldwide data hierarchy further maps the data categorization to the location of the worldwide data nodes; and wherein worldwide data structure enable analysis of data distributed across the worldwide data nodes regardless of the location of the underlying data based on a requested to analyze a type of categorized data;
    sending from the worldwide name node to the worldwide data nodes the request for data according to the worldwide hierarchy; wherein each of the worldwide data nodes serves as an index for a cluster of data;
    processing at each of the worldwide data nodes the request for data according to the worldwide hierarchy; and
    returning the result to the world wide name node.

2. The method of claim 1 wherein the data request is to determine what namespaces are available for a given data grouping; wherein a namespace is an information categorization for the given grouping of data.

3. The method of claim 1 wherein the data request is to provide the specific data located within a given namespace for the request.

4. The method of claim 2 wherein the worldwide data node is collocated on a name node and provides data location services; wherein the data location services are enabled to provide the location of data for a request.

5. The method of claim 1 wherein at least two of the data nodes are in geographically disperse locations.

6. The method of claim 2 wherein the physical location of the data is abstracted from the result of the request.

7. The method of claim 4 wherein the worldwide data node enables accessing, reading, executing algorithm and data jobs on the data.

8. A computer program product comprising:
    a non-transitory computer readable medium encoded with computer executable program code, the code configured to enable one or more processors to execute:
        sending a request for data to a worldwide name node; wherein the worldwide name node is communicatively coupled to worldwide data nodes; wherein a worldwide data hierarchy is layered over the worldwide name node and worldwide data nodes; wherein the worldwide data hierarchy classifies data distributed across the worldwide data nodes into categories according to the type of data stored on the worldwide data nodes; wherein the classification of the data into categories of the worldwide hierarchy is enabled to be unrelated to the underlying location of the data; wherein the worldwide data hierarchy further maps the data categorization to the location of the worldwide data nodes; and wherein worldwide data structure enable analysis of data distributed across the worldwide data nodes regardless of the location of the underlying data based on a requested to analyze a type of categorized data;
        sending from the worldwide name node to the worldwide data nodes the request for data according to the worldwide hierarchy; wherein each of the worldwide data nodes serves as an index for a cluster of data;
        processing at each of the worldwide data nodes the request for data according to the worldwide hierarchy; and
        returning the result to the world wide name node.

9. The computer program product of claim 8 wherein the data request is to determine what namespaces are available for a given data grouping; wherein a namespace is an information categorization for the given grouping of data.

10. The computer program product of claim 8 wherein the data request is to provide the specific data located within a given namespace for the request.

11. The computer program product of claim 9 wherein the worldwide data node is collocated on a name node and provides data location services; wherein the data location services are enabled to provide the location of data for a request.

12. The computer program product of claim 8 wherein at least two of the data nodes are in geographically disperse locations.

13. The computer program product of claim 8 wherein the physical location of the data is abstracted from the result of the request.

14. The computer program product of claim 8 wherein the worldwide data node enables accessing, reading, executing algorithm and data jobs on the data.

15. An apparatus comprising:
- one or more processors; and
- a send module, configurable to operate on one or more of the one or more processors, configured to send a request for data to a worldwide name node; wherein the worldwide name node is communicatively coupled to worldwide data nodes; wherein a worldwide data hierarchy is layered over the worldwide name node and worldwide data nodes; wherein the worldwide data hierarchy classifies data distributed across the worldwide data nodes into categories according to the type of data stored on the worldwide data nodes; wherein the classification of the data into categories of the worldwide hierarchy is enabled to be unrelated to the underlying location of the data; wherein the worldwide data hierarchy further maps the data categorization to the location of the worldwide data nodes; and
- wherein worldwide data structure enable analysis of data distributed across the worldwide data nodes regardless of the location of the underlying data based on a requested to analyze a type of categorized data;
- a sender module, configurable to operate on one or more of the one or more processors, configured to send from the worldwide name node to the worldwide data nodes the request for data; wherein each of the worldwide data nodes serves as an index for a cluster of data according to the worldwide hierarchy;
- a processing module, configurable to operate on one or more of the one or more processors, configured to process at each of the worldwide data nodes the request for data according to the worldwide hierarchy; and
- a returning module configured to return the result to the world wide name node.

16. The apparatus of claim 15 wherein the data request is to determine what namespaces are available for a given data grouping; wherein a namespace is an information categorization for the given grouping of data.

17. The apparatus of claim 15 wherein the data request is to provide the specific data located within a given namespace for the request.

18. The apparatus of claim 16 wherein the worldwide data node is collocated on a name node and provides data location services; wherein the data location services are enabled to provide the location of data for a request.

19. The apparatus of claim 15 wherein at least two of the data nodes are in geographically disperse locations.

20. The apparatus of claim 16 wherein the physical location of the data is abstracted from the result of the request.

* * * * *